United States Patent
Barnes et al.

(10) Patent No.: US 8,160,615 B1
(45) Date of Patent: Apr. 17, 2012

(54) METHOD AND SYSTEM FOR GENERATING ASSOCIATIONS BETWEEN A USER PROFILE AND WIRELESS DEVICES

(75) Inventors: James D. Barnes, Overland Park, KS (US); Peter H. Distler, Overland Park, KS (US)

(73) Assignee: Nextel Communications Inc., Reston, VA (US)

( * ) Notice: Subject to any disclaimer, the term of this patent is extended or adjusted under 35 U.S.C. 154(b) by 706 days.

(21) Appl. No.: 12/020,341

(22) Filed: Jan. 25, 2008

(51) Int. Cl.
*H04W 24/00* (2009.01)

(52) U.S. Cl. .............. 455/456.3; 455/456.1; 455/456.2

(58) Field of Classification Search ............... 455/456.1, 455/456.2, 456.3
See application file for complete search history.

(56) References Cited

U.S. PATENT DOCUMENTS

| | | | |
|---|---|---|---|
| 5,821,513 A | 10/1998 | O'Hagan et al. | |
| 5,880,449 A | 3/1999 | Teicher et al. | |
| 6,123,259 A | 9/2000 | Ogasawara | |
| 6,314,406 B1 | 11/2001 | O'Hagan et al. | |
| 6,327,570 B1 | 12/2001 | Stevens | |
| 6,507,279 B2 | 1/2003 | Loof | |
| 6,571,279 B1 | 5/2003 | Herz et al. | |
| 6,618,593 B1 * | 9/2003 | Drutman et al. ........... 455/456.3 |
| 6,837,436 B2 | 1/2005 | Swartz et al. | |
| 7,427,023 B2 | 9/2008 | Suenbuel | |
| 7,551,913 B1 * | 6/2009 | Chien ........................ 455/411 |
| 2001/0028301 A1 | 10/2001 | Geiger et al. | |
| 2002/0016740 A1 | 2/2002 | Ogasawara | |
| 2002/0035503 A1 | 3/2002 | Matsumoto | |
| 2002/0062251 A1 | 5/2002 | Anandan et al. | |
| 2002/0142722 A1 | 10/2002 | Gutta et al. | |
| 2003/0046096 A1 | 3/2003 | Shah et al. | |
| 2004/0002897 A1 | 1/2004 | Vishik | |
| 2004/0015417 A1 | 1/2004 | Youngman et al. | |
| 2004/0093265 A1 | 5/2004 | Ramchandani et al. | |
| 2005/0012613 A1 | 1/2005 | Eckstein et al. | |
| 2005/0049914 A1 | 3/2005 | Parish | |
| 2007/0192183 A1 | 8/2007 | Monaco et al. | |
| 2008/0294655 A1 * | 11/2008 | Picault et al. ................. 707/100 |
| 2009/0164459 A1 * | 6/2009 | Jennings et al. ................. 707/5 |

* cited by examiner

*Primary Examiner* — Nick Corsaro
*Assistant Examiner* — Amanuel Lebassi (57) ABSTRACT

A method is provided for generating associations between a user profile and a wireless device. The method comprises storing information about a location of a first wireless device associated with a first user profile and storing information about a location of a second of wireless device associated with a second user profile. The method also comprises determining the second wireless device is substantially collocated with the first wireless device based on the information about location of the first wireless device and the information about the location of the second wireless device. The method also comprises generating an association between the first user profile and the second wireless device based on the determining and displaying on a screen of the second wireless device a content selected based on the first user profile.

18 Claims, 5 Drawing Sheets

METHOD AND SYSTEM FOR GENERATING ASSOCIATIONS BETWEEN A USER PROFILE AND WIRELESS DEVICES

CROSS-REFERENCE TO RELATED APPLICATIONS

None.

STATEMENT REGARDING FEDERALLY SPONSORED RESEARCH OR DEVELOPMENT

Not applicable.

BACKGROUND

It is now commonplace for an individual to carry one, if not several, wireless devices such as a cellular telephone, a personal digital assistant (PDA), a pager, a mobile computer, a digital camera, a digital music player, or a wireless device comprising some combination of these devices. Such wireless devices are often capable of a multitude of functions some of which include recording audio, video, or transmitting and receiving messages, among others.

SUMMARY

In an embodiment a method is provided comprising storing information about a location of a first wireless device associated with a first user profile. The method also comprises storing information about a location of a second of wireless device associated with a second user profile. The method also comprises determining the second wireless device is substantially collocated with the first wireless device based on the information about location of the first wireless device and the information about the location of the second wireless device. The method also comprises generating an association between the first user profile and the second wireless device based on the determining and displaying on a screen of the second wireless device a content selected based on the first user profile.

In another embodiment, a method is provided comprising determining that a plurality of mobile devices are associated with a single subscriber based on information about locations of the plurality of mobile devices. The method also comprises associating a profile of the subscriber to the plurality of mobile devices. The method also comprises displaying content personalized for the subscriber on a screen of at least one of the plurality of mobile devices, wherein the content is selected based on the profile.

In another embodiment, a computer-readable medium is provided that stores a program. The program when executed by a processor, causes the processor to store information about a location of a first wireless device associated with a first user profile. The program also causes the processor to store information about a location of a second wireless device associated with a second user profile. The program also causes the processor to determine the second wireless device is substantially collocated with the first wireless device based on the information about the location of the first wireless device and the information about the location of the second wireless device. The program also causes the processor to generate an association between the first user profile and the second wireless device based on the determining.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or later in existence. The disclosure should in no way be limited to the illustrative implementations, drawings, and techniques illustrated below, but may be modified within the scope of the appended claims along with their full scope of equivalents.

The various embodiments are directed to associating multiple wireless devices with a user profile. A subscriber may use the multiple wireless devices, however all of the wireless devices may not be associated with the subscriber's user profile (e.g., company providing the cell phone). At least some embodiments determine that multiple wireless devices are used by a particular subscriber based on the information about location of the multiple wireless devices. An association is generated between the wireless devices determined to be used by the subscriber and the subscriber's user profile. Content, for example targeted advertisements, are selected based on the user profile and may be displayed on the screen of the wireless devices. This association of multiple profiles with an individual subscriber may promote construction of a broader, richer profile data set for the subscriber, perhaps composed from interactions of different kinds from each of the several devices used by the subscriber. Additionally, the association of multiple profiles with the individual subscriber based on associating multiple devices with the individual subscriber, where the different devices may have different display capabilities, may promote delivery of content to the one of multiple devices having the appropriate display capability.

Figure 1:
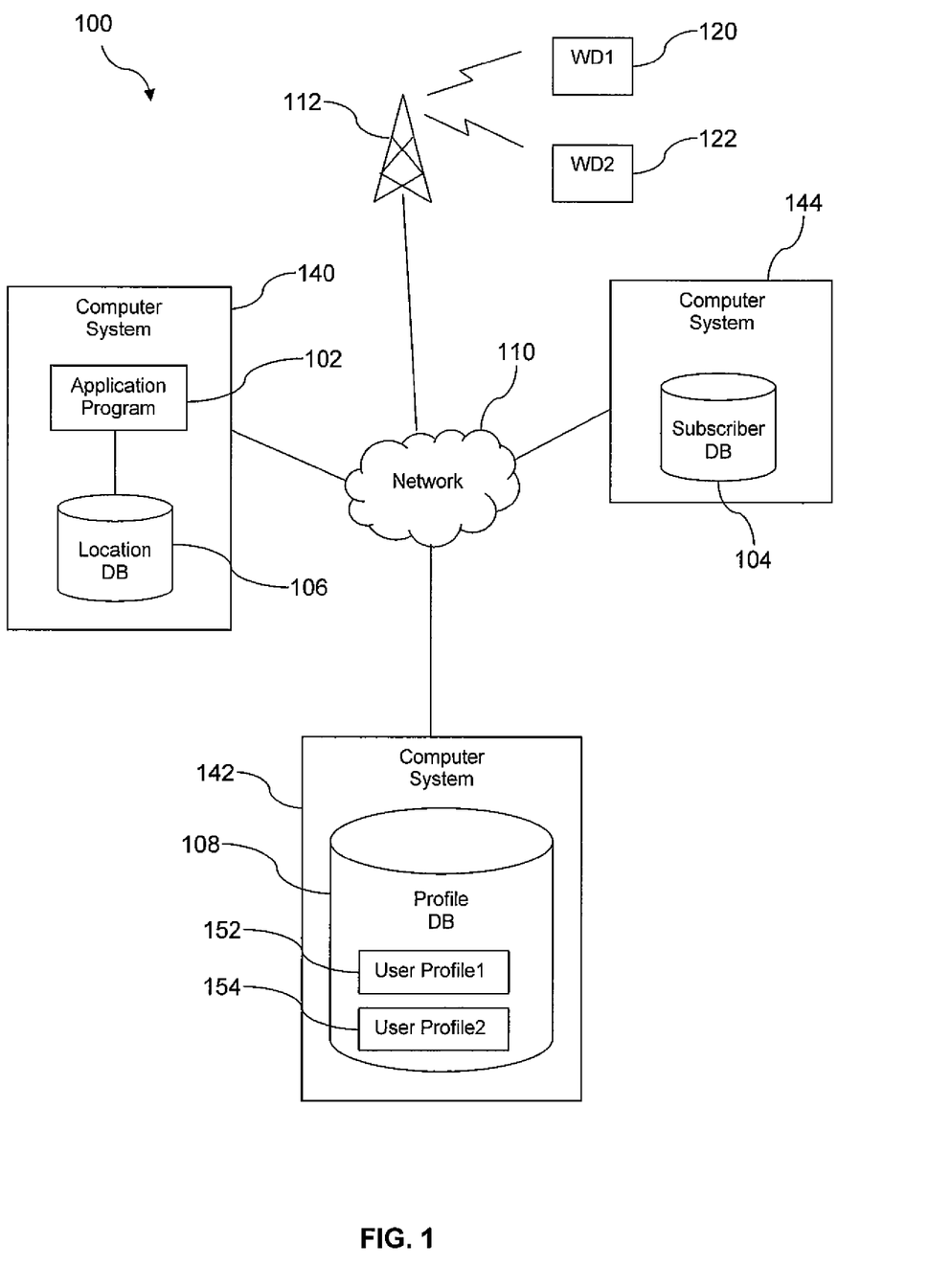
FIG. 1 shows a system for generating associations in accordance with at least some embodiments.

FIG. 1 illustrates system 100 in accordance with at least some embodiments. In particular, system 100 comprises an application program 102 executed on computer system 140, a subscriber database 104, a location database 106, a profile database 108, a base transceiver station 112 and wireless devices 120-122. The wireless devices 120-122 (e.g., mobile phones, personal digital assistants (PDA), laptop computer, tablet computer, media player, etc.) may be equivalently referred to as mobile devices. The wireless devices 120-122 are communicatively coupled to the location database 106 by way of the network 110 (e.g., wireline or wireless). In particular, the wireless devices wirelessly communicate with the base transceiver station 112 and the base transceiver station 112 communicates with the network 110. FIG. 1 illustrates the system 100 comprising two wireless devices 120-122 and one base transceiver station 112, however any number of wireless devices and base transceiver stations may be comprised.

The location database 106 comprises a computer system 140 that stores information about location of the wireless devices 120-122 and makes the information about location of the wireless devices available to the application program 102, and possibly additional computer systems executing application programs not shown in FIG. 1. The location of the wireless devices 120-122 may be determined by any one or more of a number of available location determination approaches. For example, the location of the wireless devices 120-122 is determined by a Global Positioning System (GPS) comprising a GPS receiver in the wireless devices and a GPS satellite. In other embodiments, the location of the wireless devices 120-122 is determined by triangulation from multiple base transceiver station 112 using wireless communications between the wireless device 120-122 and the base transceiver stations 112. Additionally, the location of the wireless devices 120-122 may be determined by sending a network side ping to the wireless devices 120-122 or obtaining the information about location of the wireless devices 120-122 from a Home Location Register (HLR) or a Visitor Location Register (VLR). The information about the location of the wireless devices 120-122 determined by any one or more location determination approaches, and the information about the location of the wireless devices 120-122, is stored in location database 106.

The discussion now turns to the various embodiments of determining if the wireless device 120 is substantially collocated with wireless device 122 based on the information about the location of the wireless devices 120-122. In at least some embodiments, the application program 102 executes on the computer system 140 and the application program 102 communicates with the location database 106. However, in other embodiments the application program 102 may execute on any computer system and communicate with the location database 106 by way of the network 110. The application program 102 is configured to determine if the wireless devices 120-122 are substantially collocated based on the information about the location of the wireless devices 120-122.

Consider, for purpose of explanation, that the location database 106 comprises information about the location of the wireless devices 120-122 stored over a period of time (e.g., hours, days, or weeks). Based on the information about the location of the wireless devices 120-122, the application program 102 determines if the wireless device 120 is proximate (e.g., within five feet, twenty-five feet, or one hundred feet, depending in part on the location techniques which may be used) of the wireless device 122 over the period of time. If the wireless device 120 is determined to be proximate of wireless device 122, the application program 102 then determines how frequently (e.g., twice over the period of time, or ten times over the period of time) the wireless devices 120-122 are proximate of each other. Further, the application program 102 also determines the duration (e.g., seconds, minutes, hours) that the wireless devices 120-122 are proximate of each other. If the frequency and the duration that the wireless devices 120-122 are proximate to each other is greater than or equal to a predetermined frequency and/or duration, then the application program 102 determines that the wireless device 120 is substantially collocated with wireless device 122. Another factor that may be used to determine collocation is determining that the wireless devices 120-122 are collocated at several different locations. For example, determining that the wireless devices 120-122 are collocated at a location corresponding to an office, at a location corresponding to a home, and at a location corresponding to a different city during a business trip may provide corroboration of the inference that the devices 120-122 are substantially collocated.

As illustrated in FIG. 1, the subscriber database 104 comprises a computer system 144 that stores information about a subscriber associated with the wireless devices 120-122. The information stored in subscriber databases 104 comprises information such as subscriber name, number of wireless devices associated with the subscriber, among others. Each subscriber associated with the wireless devices 120-122 is also associated with a user profile in the profile database 108. The profile database 108 comprises a computer system 142 that stores information about user profiles. A user profile or the profile of the subscriber in the profile database 108 comprises information about the subscriber's demographics (e.g., age, marital status, number of children, etc.), interests (e.g., travel, photography, hobbies), and usage (e.g., e-mail, web-browsing, etc.) of the wireless devices. Thus, each of the wireless devices 120-122 is associated with a user profile from the profile database 108 by way of the subscriber associated with the wireless devices 120-122.

A subscriber may use multiple wireless devices, however it is possible to have one or more of the multiple wireless devices associated with another subscriber. For example, a subscriber may use the wireless devices 120-122; however, in accordance with the information in the subscriber database 104, one of the wireless devices 120-122 is associated with another subscriber (e.g., subscriber's parents, subscriber's employer). Stated otherwise, the wireless device 120 is associated with a first user profile 152 in the profile database 108 and the wireless device 122 is associated with a second user profile 154 in the profile database 108. It would be beneficial, for purpose of targeted marketing, to have all the wireless devices used by a single subscriber to be associated with that subscriber's user profile.

In at least some embodiments, the application program 102 generates an association between a user profile and the wireless devices 120-122. Consider, for purpose of explanation, the previously discussed example where the wireless device 120 is associated with a first user profile and the wireless device 122 is associated with a second user profile. The location database 106 stores information about location of the wireless device 120-122 over a period of time and makes the information available to the application program 102. The application program 102 determines if the wireless device 120 is substantially collocated with wireless device 122 based on the information about the location of the wireless devices 120-122. Based on the determination, the application program 102 may draw inferences about the wireless devices 120-122. In particular, if the wireless devices 120-122 are determined to be substantially collocated, the application program 102 draws an inference that the wireless devices 120-122 are associated with a single subscriber, in spite of the fact that, in accordance with the information in the subscriber database 104, the wireless devices are associated with two subscribers. The application program 102 then generates an association between the first user profile 152 and the second wireless device 122 or the second user profile 154 and the first wireless device 120. Based on the generating, the application program 102 updates the profile database 108 to associate the second wireless device 122 with the first user profile 152 or associate the wireless device 120 with the second user profile 154. Alternatively, in an embodiment, the system 100 may combine the first user profile 152 and the second user profile 154 in a combined profile, for example in the first user profile 152, in the second user profile 154, or in a third profile (not shown). If the first user profile 152 is made the combined profile, the second user profile 154 may be deleted. If the second user profile 154 is made the combined profile, the first user profile 152 maybe delete. If the third profile is made the combined profile, both the first user profile 152 and the second user profile 154 may be deleted. Going forwards, after drawing the inference that the wireless devices 120-122 are associated with the same subscriber, usage information may be added to the combined profile.

Targeted marketing may be provided to the wireless devices 120-122 based on the associations generated by the application program 102. Targeted marketing comprises one or more of delivering personalized units of content, for example advertisements, to the wireless devices 120-122 or delivering information about current promotions, among others. It is thought that targeted marketing, that is marketing directed to a person associated with a particular group or set of interests, as indicated by the first user profile 152, is more likely to induce the user to act on the marketing information. By correctly associating the user with the wireless devices 120-122, the targeted marketing may be more successful. Consider, for purpose of explanation, that the wireless devices 120-122 are associated with the first user profile 152 based on the determination that the wireless devices 120-122 are substantially collocated. In at least some embodiments the application program 102 selects content based on the first user profile 152, and the application program 102 delivers the selected content to any one of the wireless devices 120-122. At least one of the wireless devices 120-122 is enabled to provide the content selected based on the first user profile 152 (e.g., a "Billboard", short audio/video clip, audio-only). As an example, the content may be selected sports score updates. As a different example, the content may be targeted advertising, for example an advertisement of a home improvement product targeted to a subscriber whose profile, the first user profile 152, may indicate involvement in home improvement projects.

In alternative embodiments, the delivery of the selected content, for example targeted advertisements, to the wireless devices 120-122 may be optimized based on the determination that the wireless devices 120-122 are substantially collocated. Consider, for example, that the wireless devices 120-122 are determined to be associated with a single subscriber based on the information about the location of the wireless devices 120-122 in the location database 106 and the application program 102 determines that the wireless devices 120-122 are collocated. While the wireless devices 120-122 are collocated, the application program 102 may determine to which one of the wireless devices 120-122 to deliver the content selected based on the subscriber's user profile (e.g., the first user profile 152). The determination may be based on any one or more of a number of factors, such as determining whether any of the wireless devices 120-122 is in use, determining which one of the wireless devices 120-122 has an interactive display, among others.

Figure 2:
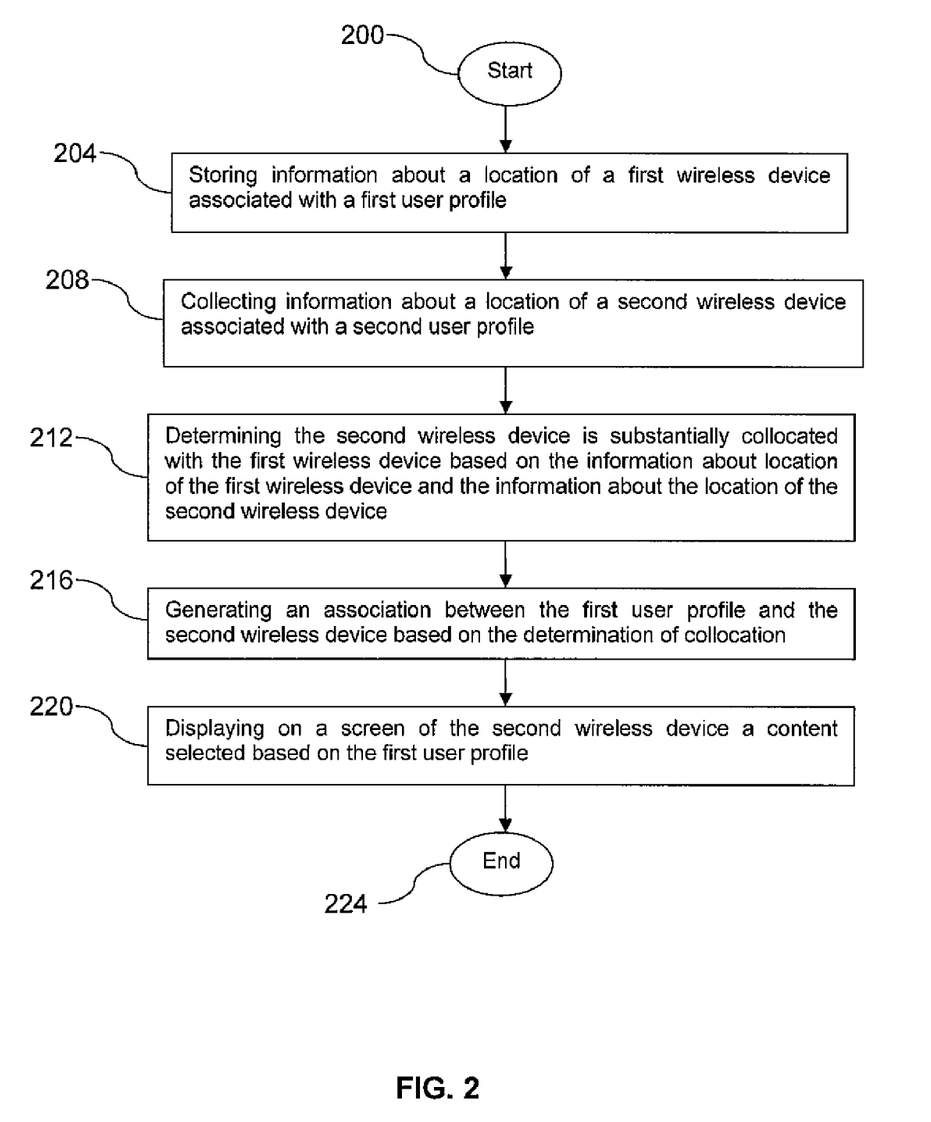
FIG. 2 shows a method in accordance with at least some embodiments.

FIG. 2 shows a method in accordance with at least some embodiments. In particular, the method starts (block 200) and moves to storing information about a location of a first wireless device associated with first user profile (block 204). Next, information about a location of a second wireless device associated with a second user profile is stored (block 208). In at least some embodiments, the information about the location of the first and second wireless devices is determined by any one or more of a number of available location determination approaches. Thereafter, based on the information about the location of the first wireless device and the information about the location of the second wireless device it is determined if the second wireless device is substantially collocated with the first wireless device (block 212). Next, an association between the first user profile and the second wireless device is generated (block 216). Finally, a unit of content selected based on the first user profile is displayed on a screen of the second wireless device (block 220), and method ends (block 224). As an example, the unit of content may be a targeted advertisement.

Figure 3:
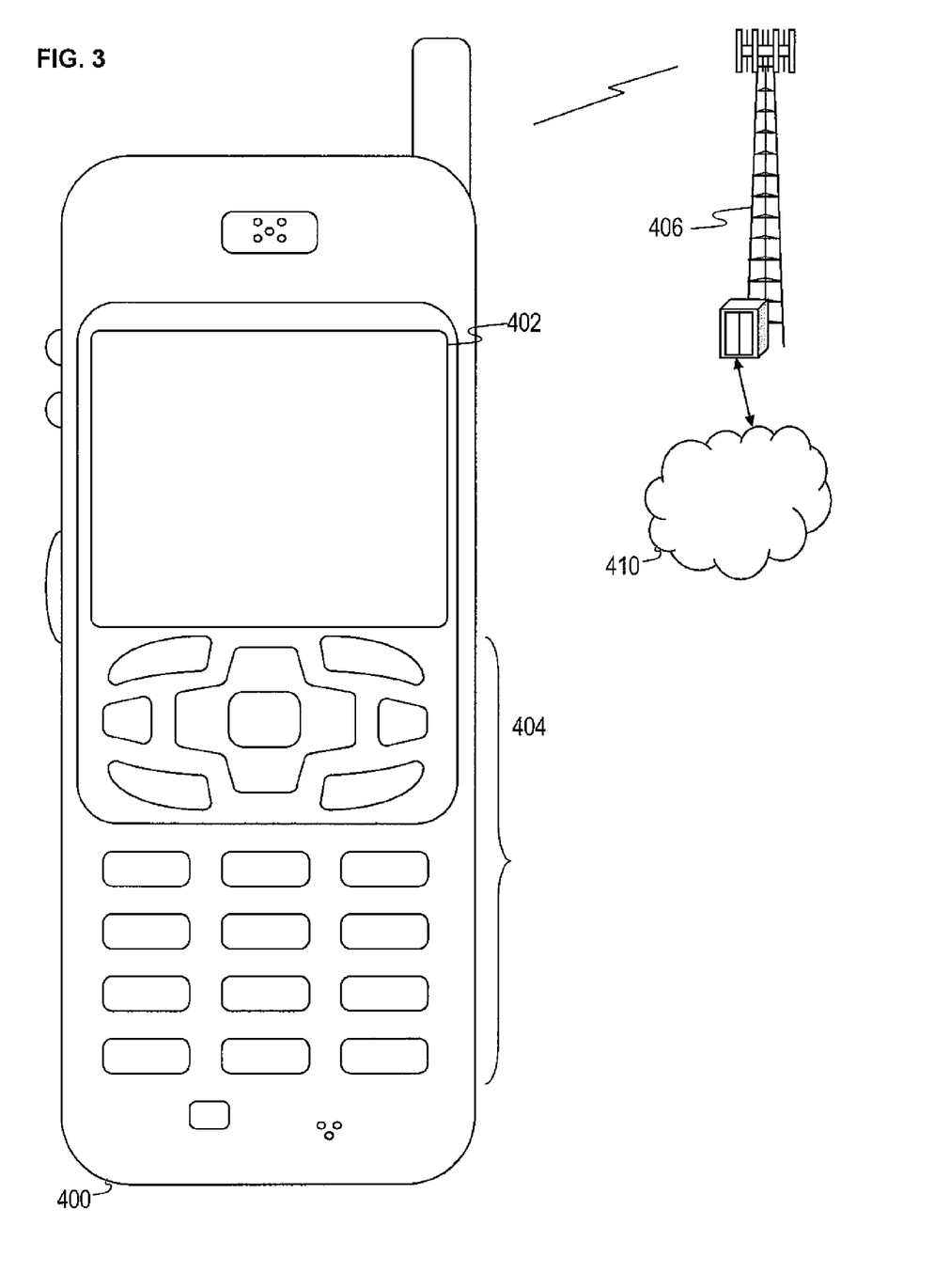
FIG. 3 shows a wireless device suitable for implementing the several embodiments of the disclosure.

FIG. 3 shows a wireless communications system including the handset 400. FIG. 3 depicts the handset 400, which is operable for implementing aspects of the present disclosure, for example for implementing wireless devices 120-122, but the present disclosure should not be limited to these implementations. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA. The handset 400 may support specialized activities such as gaming, inventory control, job control, and/or task management functions, and so on.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from a wireless base station, a wireless access point, or a peer handset 400.

The handset 400 may execute a web browser application which enables the display 402 to show a web page. The web page may be obtained via wireless communications with a cell tower 406, a wireless network access node, a peer handset 400 or any other wireless communication network or system. The cell tower 406 (or wireless network access node) is coupled to a wired network 410, such as the Internet. Via the wireless link and the wired network 410, the handset 400 has access to information on various servers. In an embodiment, the cell tower 406 is substantially similar to the base transceiver station 112 of FIG. 1, and the wired network 410 may be substantially similar to the network 110 of FIG. 1.

Figure 4:
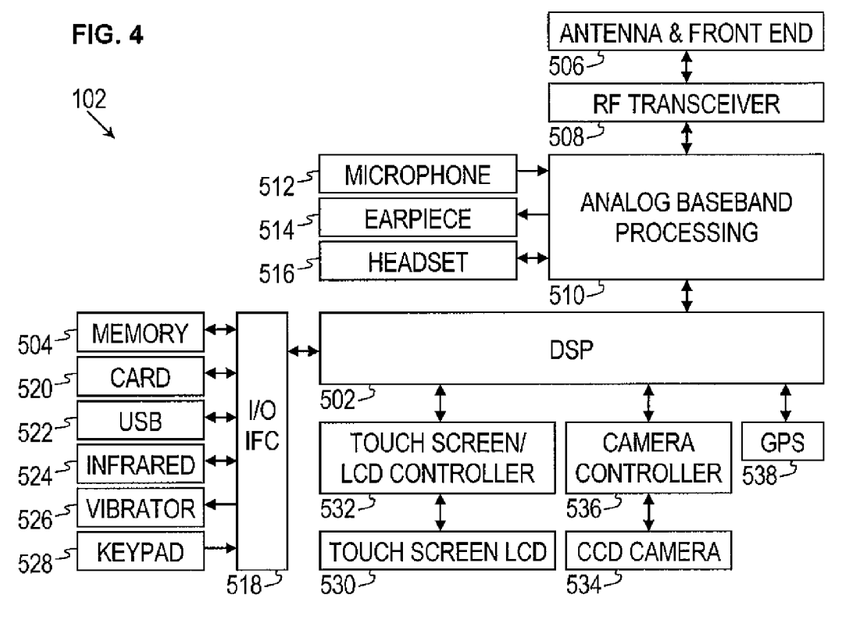
FIG. 4 is a block diagram of a wireless device according to several embodiments of the disclosure.

FIG. 4 shows a block diagram of the handset 400. While a variety of known components of handsets 102 are depicted, in an embodiment a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network or from a peer handset 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix append-ing/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/de-spreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology other than Charge Coupled Device cameras may be employed. Various other peripherals may also be included to provide additional functions, e.g., radio and television reception.

Figure 5:
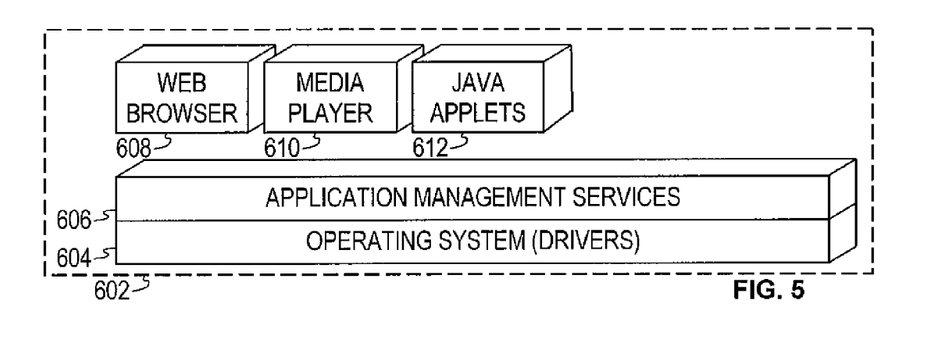
FIG. 5 is a software architecture of a wireless device according to several embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 5 are a web browser application 608, a media player application 610, and JAVA applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality.

Figure 6:
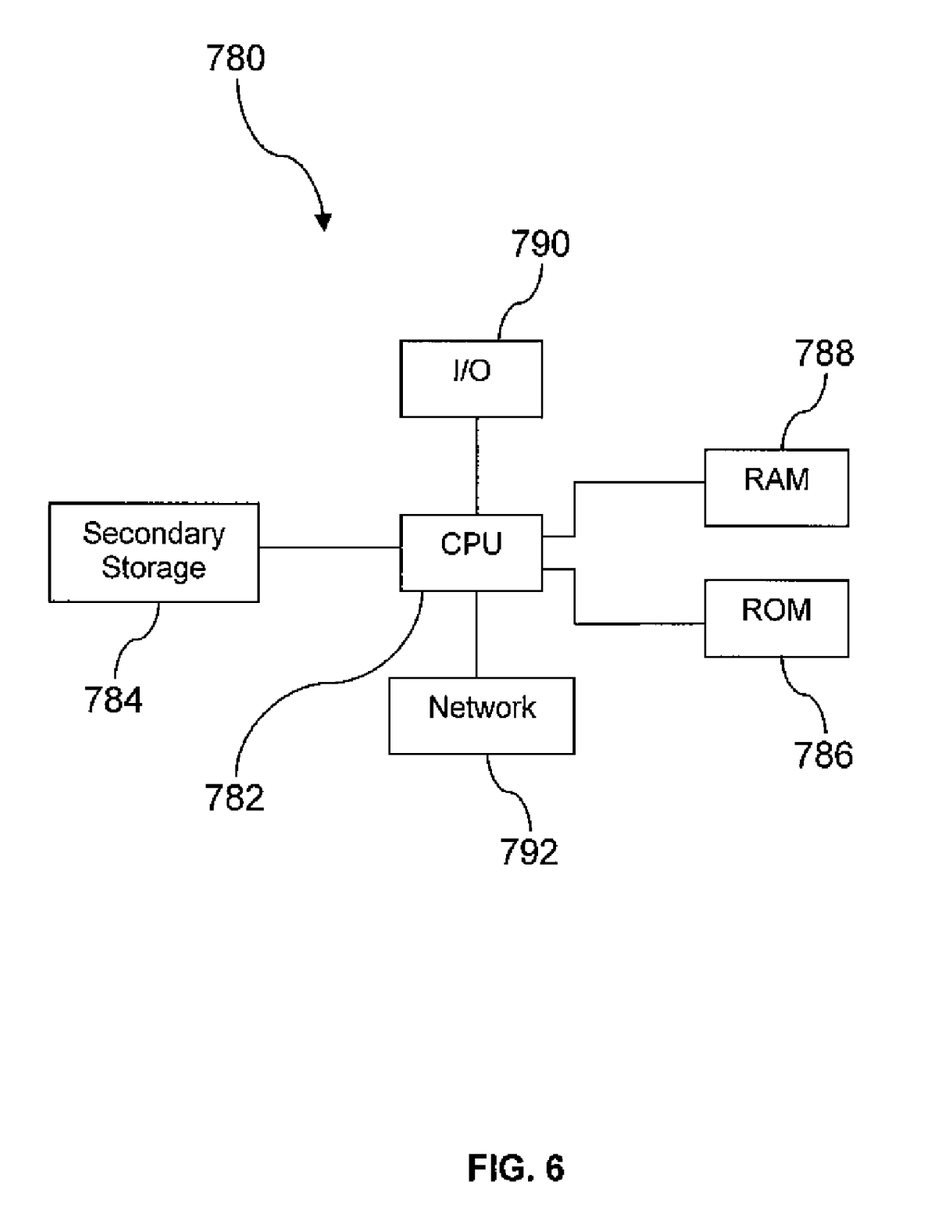
FIG. 6 shows a computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 792 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:

storing, by a computer system, information about a location of a first wireless device associated with a first user profile of a first subscriber;

storing, by the computer system, information about a location of a second wireless device associated with a second user profile of a second subscriber;

determining, by the computer system, a frequency of proximity over a period of time and a duration of proximity for the first and second wireless devices based on the stored information about the location of the first and second wireless devices;

identifying, by the computer system, the second wireless device as being substantially collocated with the first wireless device when the frequency of proximity over the period of time is greater than a first predetermined threshold and the duration of proximity is greater than a second predetermined threshold; and in response to said identifying the second wireless device as being substantially collocated with the first wireless device, generating an association between the first user profile and the second wireless device to indicate that the first wireless device and the second wireless device are used by a single subscriber.

2. The method according to claim 1 further comprising delivering personalized content selected based on the first user profile to one of the first wireless device or the second wireless device.

3. The method according to claim 1 wherein said identifying the second wireless device as being substantially collocated with the first wireless device further comprises identifying the first and second wireless devices as being in proximity in a plurality of different locations.

4. The method according to claim 1 wherein the first and second wireless devices are selected from the group consisting of a mobile phone, a personal digital assistant, a laptop computer, a tablet computer, and a media player.

5. The method according to claim 1 wherein the location of the first wireless device or the location of the second wireless device is determined using one of the Global Positioning System, a network side ping, a Home Location Register, or triangulating communication.

6. The method according to claim 1 wherein generating the association further comprises updating the first user profile to include the second wireless device.

7. A method comprising:
 determining, by a computer system, a frequency of proximity over a period of time and a duration of proximity for a plurality of mobile devices;
 identifying, by the computer system, the plurality of mobile devices as being substantially collocated with each other when the frequency of proximity over the period of time is greater than a first predetermined threshold and the duration of proximity is greater than a second predetermined threshold;
 determining, by the computer system, that the plurality of mobile devices, each mobile device associated with a separate user profile of a separate subscriber, are used by a single subscriber based on the identification of collocation of the plurality of mobile devices; and
 in response to said identifying, combining the separate user profiles of the plurality of mobile devices into a combined user profile of the single subscriber that uses the plurality of mobile devices.

8. The method according to claim 7 wherein identifying the plurality of mobile devices as being substantially collocated with each other further comprises:
 storing information about a location of the plurality of mobile devices.

9. The method according to claim 7 further comprises delivering personalized content for the single subscriber selected based on the combined user profile.

10. The method according to claim 7 wherein combining the separate user profiles of the plurality of mobile devices further comprises updating a first of the separate user profiles to include the other separate user profiles.

11. The method according to claim 7 wherein identifying the plurality of mobile devices as being substantially collocated with each other further comprises identifying the plurality of mobile devices as being in proximity in a plurality of different locations.

12. A non-transitory computer-readable medium storing a program that, when executed by a processor, causes the processor to:
 store information about a location of a first wireless device associated with a first user profile of a first subscriber;
 store information about a location of a second wireless device associated with a second user profile of a second subscriber;
 determine a frequency of proximity over a period of time and a duration of proximity for the first and second wireless devices based on the stored information about the location of the first and second wireless devices;
 identify the second wireless device as being substantially collocated with the first wireless device when the frequency of proximity over the period of time is greater than a first predetermined threshold and the duration of proximity is greater than a second predetermined threshold; and
 in response to said identifying, generate an association between the first user profile and the second wireless device to indicate that the first wireless device and the second wireless device are used by a single subscriber.

13. The non-transitory computer-readable medium of claim 12 wherein said identifying the second wireless device as being substantially collocated with the first wireless device further comprises identifying the first and second wireless devices as being in proximity in a plurality of different locations.

14. The non-transitory computer-readable medium of claim 12 wherein the program causes the processor to store the information about the location of the second wireless device by triangulating communication between the second wireless device and multiple base transceiver stations.

15. The non-transitory computer-readable medium of claim 12 wherein the program causes the processor to determine the location of the first wireless device or the second wireless device using at least one of the Global Positioning System; a network side ping; and a Home Location Register.

16. The non-transitory computer-readable medium of claim 12 wherein the program causes the processor to target personalized content to the single subscriber based on the first user profile.

17. The non-transitory computer-readable medium of claim 12 wherein the program causes the processor to deliver personalized advertisements selected based on the first user profile to the first wireless device and to the second wireless device.

18. The non-transitory computer-readable medium of claim 12 wherein to generate the association further comprises to update the first user profile to include the second wireless device.

\* \* \* \* \*